(12) United States Patent
Stevens, Jr. et al.

(10) Patent No.: US 7,837,931 B2
(45) Date of Patent: Nov. 23, 2010

(54) METHOD OF USING SOLUBILIZED TRANSITION METAL OXIDES IN WELL OPERATIONS

(75) Inventors: Richard F. Stevens, Jr., Sugar Land, TX (US); Mingjie Ke, Spring, TX (US); Qi Qu, Spring, TX (US)

(73) Assignee: BJ Services Company LLC, Houston, TX (US)

( * ) Notice: Subject to any disclaimer, the term of this patent is extended or adjusted under 35 U.S.C. 154(b) by 543 days.

(21) Appl. No.: 11/800,227

(22) Filed: May 4, 2007

(65) Prior Publication Data

US 2008/0274013 A1 Nov. 6, 2008

(51) Int. Cl.
*C23F 11/10* (2006.01)
(52) U.S. Cl. .............................. 422/19; 422/16; 422/17
(58) Field of Classification Search ........................ None
See application file for complete search history.

(56) References Cited

U.S. PATENT DOCUMENTS

| 3,079,345 | A | * | 2/1963 | Monroe et al. | 507/248 |
|---|---|---|---|---|---|
| 4,444,668 | A | | 4/1984 | Walker et al. | |
| 5,261,491 | A | * | 11/1993 | Stewart et al. | 166/279 |
| 5,697,443 | A | | 12/1997 | Brezinski et al. | |
| 5,763,368 | A | | 6/1998 | Brezinski | |
| 5,976,416 | A | | 11/1999 | Brezinski | |
| 6,192,987 | B1 | * | 2/2001 | Funkhouser et al. | 166/304 |
| 6,511,613 | B1 | | 1/2003 | Cizek et al. | |
| 2004/0138071 | A1 | | 7/2004 | Gupta et al. | |
| 2005/0067164 | A1 | * | 3/2005 | Ke et al. | 166/304 |
| 2005/0169794 | A1 | * | 8/2005 | Welton et al. | 422/15 |
| 2006/0264335 | A1 | | 11/2006 | Penna et al. | |

OTHER PUBLICATIONS

Ezzat, et al; "Solids-Free, High-Density Brines for Packer-Fluid Applications", Journal of Petroleum Technology, pp. 491-498, Apr. 1988.
Stevens, et al; Oilfield Environment-Induced Stress Corrosion Cracking of CRAs in Completion Brines; SPE Annual Technical Conference and Exhibition, Houston, TX; SPE 90188: Sep. 2004.
Ke, et al; Thermal Decomposition of Thiocyanate Corrosion Inhibitors—A Potential Problem for Successful Well Completions; SPE Annual Technical Conference and Exhibition on Formation Damage Control, Lafayette, LA; SPE 98302; Feb. 2006.
Mack et al; Stress Corrosion Cracking of a Cold Worked 22 Cr Duplex Stainless Steel Production Tubing in a High Density Clear Brine CaCl Packer Fluid; NACE International; Paper No. 02067; 2002.
Hudson, T.E.; Corrosivity of Heavyweight Brines—Understanding It and Techniques Operators Can Use to Control It; 18th Annual OTC, Houston, TX; OTC 5266; May 1986.

* cited by examiner

*Primary Examiner*—Elizabeth L McKane
(74) *Attorney, Agent, or Firm*—John Wilson Jones; Jones & Smith, LLP

(57) ABSTRACT

A corrosion inhibitor package containing an acetylenic amine or acetylenic alcohol enables a sulfur-free method for protecting metal tubulars and equipment. The package has particular applicability in the protection of carbon steel tubulars in high density brines at elevated temperatures. The corrosion inhibitor package may contain a transition metal oxide as a corrosion inhibitor intensifier.

26 Claims, No Drawings

METHOD OF USING SOLUBILIZED TRANSITION METAL OXIDES IN WELL OPERATIONS

FIELD OF THE INVENTION

The invention relates to compositions for controlling or inhibiting corrosion of metallic surfaces during well operations and a method of using the same.

BACKGROUND OF THE INVENTION

Corrosion of metallic surfaces, such as down hole tubulars, during well operations is not uncommon and is evidenced by surface pitting, localized corrosion and loss of metal. Such metallic surfaces are typically composed of carbon steels, ferritic alloy steels, and high alloy steels including chrome steels, duplex steels, stainless steels, martensitic alloy steels, austenitic stainless steels, precipitation-hardened stainless steels and high nickel content steels.

Solid-free brines, commonly used in drilling and completion fluids, are typically high density brines. Brines typically used in completion and work-over fluids are tabulated in Table I with their respective density range:

TABLE I

| Aqueous Brine Composition | Brine Density Range, pounds per gallon (ppg) |
| --- | --- |
| $KHCO_2$ | 8.3-13.3 |
| $NaHCO_2$ | 8.3-10.9 |
| NaBr | 8.3-12.7 |
| NaCl/NaBr | 10.0-12.7 |
| $CaCl_2$ | 8.3-11.6 |
| $CaBr_2$ | 8.3-15.3 |
| $CaCl_2/CaBr_2$ | 11.6-15.1 |
| $CaCl_2/CaBr_2/ZnBr_2$ | 15.1-19.2 |
| $CaBr_2/ZnBr_2$ | 14.2-19.2 |
| $CsHCO_2$ | 8.3-19.2 |

Such brines, especially higher density brines (like calcium chloride, calcium bromide, zinc bromide and mixtures thereof), have a high salt content and thus are highly corrosive. Marked corrosivity may be seen, for instance, when such brines are used as packer fluids since they remain in contact with production tubing and casing for an extended period of time.

The high corrosivity demonstrated by use of such high-density brines may cause a failure of down hole tubulars. Conventionally, a corrosion inhibitor or a corrosion inhibitor package is added to the brine to prevent or minimize brine corrosion on such metallic surfaces. Typically, the corrosion inhibitor or corrosion inhibitor package is added before or during the well operation.

Two types of inhibitors are conventionally used: film-forming amines and low molecular weight inorganic thiocyanate ($SCN^-$) compounds. Film-forming amine inhibitors are often more effective when used at temperatures below 250° F. while the low-molecular weight inorganic thiocyanate inhibitors typically provide corrosion protection up to 350° F.

For the past twenty years, it is the sulfur containing corrosion inhibitors which have dominated the industry in light of their low cost and high efficiency. Unfortunately, sulfur-related stress corrosion cracking may occur from use of such corrosion inhibitors. Corrosion cracking translates into tubular failures. Even when no hydrogen sulfide is produced in the well, the thermal decomposition of sulfur-containing inhibitors may lead to sulfur-related stress corrosion cracking. Such inhibitors decompose at elevated bottomhole temperatures and release hydrogen sulfide. The release of hydrogen sulfide as a decomposition product is believed to induce sulfide stress corrosion cracking of the alloy tubulars. An increase in tubular failures due to stress corrosion cracking is further partially attributed to the use of high strength alloys such as 13 Chromium materials (e.g. modified 13 Cr and super 13 Cr tubulars with yield strengths of 95 and 110 ksi or more, respectively).

Efforts have been undertaken to find alternative corrosion inhibitors for use with high density brines which are capable of controlling, reducing or inhibiting corrosion without inducing sulfur-related corrosion cracking of metallic alloy tubulars. Such efforts have been principally focused on the development of sulfur-free corrosion inhibitors.

SUMMARY OF THE INVENTION

Corrosion may be controlled during operations of a well by introducing into the well a corrosion inhibitor package containing an acetylenic alcohol or an acetylenic amine. The acetylenic alcohol or amine contains between from about 2 to about 12 carbon atoms. Derivatives of such alcohols or amines, such as halide or nitrate salts, may also be used. The corrosion inhibitor package has particular applicability in the reduction and/or inhibition of corrosion of metal surfaces, such as tubular surfaces, which are subject to corrosivity during operations of gas, oil, geothermal, water injection, steam injection, deviated and deep wells.

Preferred acetylenic amines are propargylamine, a propargylamine salt, N-methyl propargylamine, N,N-diethyl-2-propynyamine and 1,1-dimethylprop-3-inylamine.

Suitable acetylenic alcohols include methyl-butynol.

In a preferred embodiment, the corrosion inhibitor package further contains a transition metal oxide, other than an iron containing metal oxide. Preferred non-ferrous containing metal oxides are antimony oxide, molybdenum oxide, titanium oxide, copper oxide, bismuth oxide, chromium oxide and zirconium oxide. The metal oxide is preferably dissolved in a chelating agent, such as a phosphonic acid, alkyl phosphonic acid or aminoalkyl phosphonic acid or a salt derivative prior to being introduced to the corrosion inhibitor.

While the temperature of the well being treated may be as high as 275° F. with the corrosion inhibitor package, the presence of the metal oxide in the corrosion inhibitor package permits treatment of a well which exhibits temperatures as high as 400° F.

DETAILED DESCRIPTION OF THE PREFERRED EMBODIMENTS

Corrosive effects on metallic surfaces may be dramatically reduced by use of a corrosion inhibitor package which contains a corrosion inhibitor and, optionally, a corrosion inhibitor intensifier. The combination of corrosion inhibitor intensifier and corrosion inhibitor exhibits synergistic effects on inhibition and/or reduction of corrosion of metal tubular surfaces conventionally used in wells. The corrosion inhibitor package defined herein enables a sulfur-free method for protecting metal tubulars and equipment.

The corrosion inhibitor package has particular applicability in those instances where a high density brine is used in an operation for a gas, oil, geothermal, water injection, deviated and steam injection wells. The corrosion inhibitor package is further particularly efficacious in the control of corrosion and/or protection of metallic alloy surfaces from corrosion.

The corrosion inhibitor is an acetylenic alcohol or amine. Typically, the acetylenic alcohol or amine contains between from about 2 to about 12 carbon atoms and may be branched or unbranched. The alcohol or amine moiety may appear at the terminal end of the acetylenic alcohol or acetylenic amine or may be attached to a carbon within the unbranched or branched backbone of the alcohol or amine. The alcohol or amine moiety may further be substituted.

Exemplary as the corrosion inhibitor are acetylenic amines such as propargylamine, propargylamine salts like propargylamine hydrochloride, substituted propargylamines such as N-methyl propargylamine, N,N-diethyl-2-propynyamine (DEP), 1,1-dimethylprop-3-inylamine (MPA) and dialkylaminoalkynols. In addition, a derivative of an acetylenic alcohol or amine may be used, such as a halide or nitrate salt. Preferred halides include bromide, fluoride, chloride and iodide.

Suitable acetylenic alcohols include hexynol, dimethyl hexynol, diethyl hexynediol, dimethyl hexynediol, dimethyl octynediol, 3-butyn-1-ol, methyl butynol, methyl pentynol, ethynyl cyclohexynol, 2-ethyl hexynol, phenyl butynol, ditertiary acetylenic glycol, butynediol, 1-ethynyl-cyclohexanol, 3-methyl-1-nonyn-3ol, 2-methyl-3-butyn-2-ol, 1-propyn-3ol, 1-butyn-3-ol, 1-pentyn-3-ol, 1-heptyn-3-ol, 1-octyn-3-ol, 1-nonyn-3-ol, 1-decyn-3-ol and 1-(2,4,6-trimethyl-3-cyclohexenyl)-3-propyne-1-ol. The preferred acetylenic alcohol is methyl-butynol.

Typically, the amount of corrosion inhibitor in the corrosion inhibitor package which is introduced into the well is between from about 0.01 g/100 cc brine to about 2 g/100 cc brine, most typically about 0.435 g/100 cc brine. Typically, the amount of corrosion inhibitor intensifier in the corrosion inhibitor package which is introduced into the well is between from about 0.01 g/100 cc brine to about 0.3 g/100 cc brine, most typically about 0.0375 g/100 cc brine.

In a preferred embodiment, the corrosion inhibitor package is used in combination with a high density brine, the density of the brine being greater than or equal to 10 ppg. Such brines include calcium chloride brine, calcium bromide brine and zinc halide brines, like zinc bromide brine, as well as mixtures of such salts. Further exemplary brines include those set forth in Table I above.

When introduced to a brine, the amount of corrosion inhibitor package is between from about 0.1 g/100 cc to about 3 g/100 cc brine. Typically, the brine composition contains about 0.5 g/100 cc corrosion inhibitor package.

The corrosion inhibitor package is introduced to the brine, either during, before or after introduction of the brine into the well being treated.

The composition is especially useful in the control, prevention and/or reduction of corrosion of carbon steels, ferritic alloy steels, and high alloy steels such as chrome steels, duplex steels, stainless steels, martensitic alloy steels, austenitic stainless steels, precipitation-hardened stainless steels and high nickel content steels. The corrosion inhibitor package has particular applicability in operations of oil or gas wells wherein the tubulars are composed of carbon steel.

The corrosion inhibitor package further preferably contains a transition metal oxide. The transition metal oxide preferably does not contain iron. Preferred as the transition metal oxide corrosion inhibitor intensifier are antimony oxide, molybdenum oxide, titanium oxide, copper oxide, bismuth oxide, chromium oxide and zirconium oxide as well as mixtures thereof.

Use of the corrosion inhibitor intensifier enables use of the corrosion inhibitor package at higher operating well temperature. For instance, the temperature of the well being treated may be as high as 275° F., and in some cases as high as 400° F., when the corrosion inhibitor package contains a corrosion inhibitor intensifier. This may be contrasted to a similarly composed corrosion inhibitor package which does not contain a corrosion inhibitor intensifier wherein the operating temperature of the well may be as high. Use of the corrosion inhibitor intensifier in the corrosion inhibitor package further enables the use of a higher density brine in the operation treatment of the well.

The transition metal oxide is preferably solubilized in a chelating agent or a mixture of chelating agents prior to being introduced to the brine. Suitable chelating agents include phosphonic acid, alkyl phosphonic acids and aminoalkyl phosphonic acids and esters and salts thereof. Exemplary of such chelating agents are 1-hydroxyethylidene-1,1-diphosphonic acid-1 (HEDP), aminotri(methylene phosphonic acid (ATMP) and diethylenetriaminepentamethylenephosphonic acid (DTPMP).

Examples of suitable aminoalkyl phosphonic acids, esters and salts include ethylenediamine tetra(methylene phosphonate), diethylenetriamine penta(methylene phosphonate) and the triamine- and tetramine-polymethylene phosphonates with from about two to about ten, preferably from about 2 to about 6, methylene groups between each nitrogen atom.

Also preferred as chelating agent are polyaminoalkylene phosphonates having between from about 2 to about 10 nitrogen atoms, most preferably polyaminomethylene phosphonates. In a most preferred embodiment, at least each nitrogen of the compound contains at least one methylene phosphonic group.

In a preferred embodiment, the chelating agent is either bis-aminoalkyl ether phosphonate or a mixture of a monoalkanol amine phosphonate and a bis-hexaalkylene triamine phosphonate.

Other chelating agents, like ethylenediaminetetraacetic acid (EDTA), cyclohexanediaminetetraacetic acid (CDTA), diethylenediaminepentaacetic acid (DTPA), lactic acid and nitrilotriacetic acid (NTA) or their salts may also be suitable.

The chelating agent likely chelates the transition metal oxide and forms a chelant. Typically, the solution contains between from about 10 to about 90 weight percent of chelating agent. Subsequent to solubilization of the metal oxide by the chelating agent, the solution is then added to the brine. The corrosion inhibitor is then typically added to the brine under agitation.

In a preferred embodiment, the corrosion inhibition package is used, with the high density brine, as a completion or workover fluid in petroleum recovery operations. Such completion or workover fluids may be used in deep wells including those wherein a plurality of zones are completed. In addition to completion operations on a well to place the well into production, the completion or workover fluid may be used to fill the annular space between the casing and the tubing above packers. In this case, the composition may be left throughout the life of the well or until reworking is desired.

The following examples will illustrate the practice of the present invention in its preferred embodiments. Other embodiments within the scope of the claims herein will be apparent to one skilled in the art from consideration of the specification and practice of the invention as disclosed herein. It is intended that the specification, together with the examples, be considered exemplary only, with the scope and spirit of the invention being indicated by the claims which follow.

EXAMPLES

Examples 1-38

Corrosion inhibitor formulations were prepared as set forth in the Tables below wherein DEP is N,N-diethyl-2-propynyamine. The $Sb_2O_3$ was first dissolved in a mixture of 50% (wt.) Products 8036 and 50% (wt.) 8041 chelating agents from Special Products at a weight ratio of 1:9 under agitation at 70° F. After the $Sb_2O_3$ solution was prepared, it was then added to brines along with corrosion inhibitor for corrosion testing.

In all of the Examples, C4130 carbon steel coupons were immersed in varying densities of $ZnBr_2/CaBr_2/CaCl_2$ brines for seven days at 275° F., 325° F. or 350° F. under 400 psig nitrogen headspace gas. The coupon was weighed before and after testing and the weight loss was converted to corrosion rate in mpy. Based on the weight loss of metal coupon, the corrosion rate was calculated by the following formula:

Corrosion Rate=$[5.34 \times 10^5 \times$ weight loss (g)]/[metal density (g/cm$^3$)×metal area (in$^2$)×time exposure (hr.)]

The results are compiled in Tables 1-4:

TABLE 1

Corrosion Rates of C4130 Carbon Steels in $ZnBr_2/CaBr_2/CaCl_2$ over 7 Days at 275° F.

| Ex. No. | Brine Density, ppg | Corrosion Inhibitor Package Loading | Corrosion Rate, mpy |
|---|---|---|---|
| Comp. Ex. 1 | 17.2 | None | 8.3 |
| Comp. Ex. 2 | 17.4 | None | 8.5 |
| 3 | 17.2 | 0.40 g/100 cc DEP | 5.3 |
| 4 | 17.4 | 0.40 g/100 cc DEP | 5.0 |

TABLE 2

Corrosion Rates of C4130 Carbon Steels in $ZnBr_2/CaBr_2/CaCl_2$ over 7 days at 300° F.

| Ex. No. | Brine Density, ppg | Corrosion Inhibitor Package Loading | Corrosion Rate, mpy |
|---|---|---|---|
| Comp. Ex. 5 | 17.6 | None | 13.1 |
| Comp. Ex. 6 | 17.8 | None | 16.6 |
| Comp. Ex. 7 | 18.0 | None | 20.8 |
| Comp. Ex. 8 | 18.2 | None | 29.4 |
| 9 | 17.6 | 0.40 g/100 cc DEP + 0.0375 g/100 cc $Sb_2O_3$ | 1.4 |
| 10 | 17.8 | 0.40 g/100 cc DEP + 0.0375 g/100 cc $Sb_2O_3$ | 3.1 |
| 11 | 18.0 | 0.40 g/100 cc DEP + 0.0375 g/100 cc $Sb_2O_3$ | 4.5 |
| 12 | 18.2 | 0.40 g/100 cc DEP + 0.0375 g/100 cc $Sb_2O_3$ | 5.6 |

TABLE 3

Corrosion Rates of C4130 Carbon Steels in $ZnBr_2/CaBr_2/CaCl_2$ over 7 Days at 325° F.

| Ex. No. | Brine Density, ppg | Corrosion Inhibitor Package Loading, | Corrosion Rate, mpy |
|---|---|---|---|
| Comp. Ex. 13 | 17.6 | None | 20.0 |
| Comp. Ex. 14 | 17.8 | None | 18.9 |
| Comp. Ex. 15 | 18.0 | None | 21.2 |
| Comp. Ex. 16 | 18.2 | None | 29.7 |
| 17 | 17.6 | 0.40 g/100 cc DEP + 0.0375 g/100 cc $Sb_2O_3$ | 2.2 |
| 18 | 17.8 | 0.40 g/100 cc DEP + 0.0375 g/100 cc $Sb_2O_3$ | 4.5 |
| 19 | 18.0 | 0.40 g/100 cc DEP + 0.0375 g/100 cc $Sb_2O_3$ | 6.7 |
| 20 | 18.2 | 0.40 g/100 cc DEP + 0.0375 g/100 cc $Sb_2O_3$ | 13.7 |
| 21 | 17.6 | 0.50 g/100 cc propargylamine hydrochloride + 0.0375 g/100 cc $Sb_2O_3$ | <1.0 |
| 22 | 17.8 | 0.50 g/100 cc propargylamine hydrochloride + 0.0375 g/100 cc $Sb_2O_3$ | <1.0 |
| 23 | 18.0 | 0.50 g/100 cc propargylamine hydrochloride + 0.0375 g/100 cc $Sb_2O_3$ | 4.5 |
| 24 | 18.2 | 0.50 g/100 cc propargylamine hydrochloride + 0.0375 g/100 cc $Sb_2O_3$ | 12.3 |
| 25 | 17.6 | 0.43 g/100 cc propargylamine + 0.0375 g/100 cc $Sb_2O_3$ | <1.0 |
| 26 | 17.8 | 0.43 g/100 cc propargylamine + 0.0375 g/100 cc $Sb_2O_3$ | <1.0 |
| 27 | 18.0 | 0.43 gg/100 cc propargylamine + 0.0375 g/100 cc $Sb_2O_3$ | 1.3 |
| 28 | 18.2 | 0.43 g/100 cc propargylamine + 0.0375 g/100 cc $Sb_2O_3$ | 5.8 |

TABLE 4

Corrosion Rates of C4130 Carbon Steels in $ZnBr_2/CaBr_2/CaCl_2$ over 7 Days at 350° F.

| Ex. No. | Brine Density, ppg | Corrosion Inhibitor Package Loading | Corrosion Rate, mpy |
|---|---|---|---|
| Comp. Ex. 29 | 18.0 | None | 24.8 |
| 30 | 18.0 | 0.40 g/100 cc DEP + 0.0375 g/100 cc $Sb_2O_3$ | 5.7 |
| 31 | 18.0 | 0.40 g/100 cc DEP + 0.043 g/100 cc propargylamine + 0.0375 g/100 cc $Sb_2O_3$ | 5.4 |
| 32 | 18.0 | 0.43 g/100 cc Propargylamine + 0.0375 g/100 cc $Sb_2O_3$ | <1.0 |
| 33 | 18.0 | 0.42 g/100 cc N-methyl propargylamine + 0.0375 g/100 cc $Sb_2O_3$ | <1.0 |
| 34 | 18.2 | None | 29.6 |
| 35 | 18.2 | 0.40 g/100 cc DEP + 0.0375 g/100 cc $Sb_2O_3$ | 16.3 |
| 36 | 18.2 | 0.40 g/100 cc DEP + 0.043 g/100 cc propargylamine + 0.0375 g/100 cc $Sb_2O_3$ | 11.2 |
| 37 | 18.2 | 0.43 g/100 cc Propargylamine + 0.0375 g/100 cc $Sb_2O_3$ | 7.5 |

TABLE 4-continued

Corrosion Rates of C4130 Carbon Steels in ZnBr$_2$/CaBr$_2$/CaCl$_2$ over 7 Days at 350° F.

| Ex. No. | Brine Density, ppg | Corrosion Inhibitor Package Loading | Corrosion Rate, mpy |
|---|---|---|---|
| 38 | 18.2 | 0.42 g/100 cc N-methyl propargylamine + 0.0375 g/100 cc Sb$_2$O$_3$ | 5.6 |

Tables 1-4 demonstrate the effectiveness of the corrosion inhibitors in the current invention and the synergistic effect achieved on corrosion inhibition when the corrosion inhibitor intensifier of the present invention is utilized. Such is apparent even in very high density brines.

Examples 39-50

Using the procedures set forth for Examples 1-38, corrosion inhibitor packages were prepared as set forth in Tables 5 and 6 below. All tests were conducted with C4130 carbon steel coupons in different densities of ZnBr$_2$/CaBr$_2$/CaCl$_2$ brines at 325° F. for seven and thirty days. The coupon was weighed before and after testing and the weight loss was converted to corrosion rate in mpy. Tables 5 and 6 illustrate the results.

TABLE 5

Corrosion Rates of C4130 Carbon Steels in ZnBr$_2$/CaBr$_2$/CaCl$_2$ Brines over 7 Days at 325° F.

| Ex. No. | Brine Density, ppg | Corrosion Inhibitor Package Loading | Corrosion Rate, mpy |
|---|---|---|---|
| Comp. Ex. 39 | 17.6 | 0.435 g/100 cc methyl butynol + 0.0375 g/100 cc Sb$_2$O$_3$ | 1.3 |
| 40 | 17.8 | 0.435 g/100 cc methyl butynol + 0.0375 g/100 cc Sb$_2$O$_3$ | 3.0 |
| 41 | 18.0 | 0.435 g/100 cc methyl butynol + 0.0375 g/100 cc Sb$_2$O$_3$ | 7.1 |
| 42 | 18.2 | 0.435 g/100 cc methyl butynol + 0.0375 g/100 cc Sb$_2$O$_3$ | 11.4 |

TABLE 6

Corrosion Rates of C4130 Carbon Steels in ZnBr$_2$/CaBr$_2$/CaCl$_2$ Brines over 30 Days at 325° F.

| Ex. No. | Brine Density, ppg | Corrosion Inhibitor Package Loading | Corrosion Rate, mpy |
|---|---|---|---|
| Comp. Ex. 43 | 17.6 | None | 7.2 |
| Comp. Ex. 44 | 17.8 | None | 7.6 |
| Comp. Ex. 45 | 18.0 | None | 8.3 |
| Comp. Ex. 46 | 18.2 | None | 8.5 |
| 47 | 17.6 | 0.435 g/100 cc methyl butynol + 0.0375 g/100 cc Sb$_2$O$_3$ | 1.3 |
| 48 | 17.8 | 0.435 g/100 cc methyl butynol + 0.0375 g/100 cc Sb$_2$O$_3$ | 1.8 |
| 49 | 18.0 | 0.435 g/100 cc methyl butynol + 0.0375 g/100 cc Sb$_2$O$_3$ | 2.6 |
| 50 | 18.2 | 0.435 g/100 cc methyl butynol + 0.0375 g/100 cc Sb$_2$O$_3$ | 4.2 |

Tables 5 and 6 clearly demonstrate the effectiveness of the acetylenic alcohol corrosion inhibitor package defined by the current invention.

From the foregoing, it will be observed that numerous variations and modifications may be effected without departing from the true spirit and scope of the novel concepts of the invention.

What is claimed is:

1. A method of controlling, reducing and/or inhibiting corrosion of metallic surfaces in a well during an oilfield treatment process which comprises introducing into the well a composition comprising:
   (i.) at least one C$_2$-C$_{12}$ acetylenic alcohol or amine or a halide or nitrate salt derivative thereof; and
   (ii.) a solubilized transition metal oxide, wherein the transition metal oxide is other than an iron containing metal oxide for a time sufficient to control, reduce and/or inhibit corrosion of metal.

2. The method of claim 1, wherein the composition contains a brine having a density greater than or equal to 10 ppg.

3. The method of claim 2, wherein the brine contains zinc halide salt.

4. The method of claim 1, wherein the composition comprises a C$_2$-C$_{12}$ acetylenic amine selected from the group consisting of propargylamine, a propargylamine salt, a dialkylaminoalkynol, N-methyl propargylamine, N,N-diethyl-2-propynyamine and 1,1-dimethylprop-3-inylamine.

5. The method of claim 1, wherein the transition metal oxide is selected from the group consisting of antimony oxide, molybdenum oxide, titanium oxide, copper oxide, bismuth oxide, chromium oxide and zirconium oxide.

6. The method of claim 1, wherein the metallic surface is of carbon steel.

7. The method of claim 1, wherein the transition metal oxide is solubilized in a chelating agent selected from the group consisting of phosphonic acid, an alkyl phosphonic acid, an aminoalkyl phosphonic acid or a salt or ester derivative thereof.

8. The method of claim 7, wherein the chelating agent is an aminoalkyl phosphonic acid or salt derivative thereof.

9. The method of claim 8, wherein the chelating agent is (i.) a bis-aminoalkyl ether phosphonate or (ii) a mixture of a monoalkanol amine phosphonate and a bis-hexalkylene triamine phosphonate.

10. The method of claim 1, wherein the at least one C$_2$-C$_{12}$ acetylenic alcohol or amine is methyl-butynol.

11. The method of claim 1, wherein the composition is introduced to a brine having a density greater than or equal to 10 ppg either during, before or after the brine is introduced into the well.

12. A method of controlling, reducing and/or inhibiting the corrosive effects on a metallic alloy surface during a well operation with a brine having a density greater than or equal to 10 ppg, the method comprising introducing to the brine, either during, before or after introduction of the brine into the well, a composition comprising:
   (i.) a $C_2$-$C_{12}$ acetylenic alcohol, or a $C_2$-$C_{12}$ acetylenic amine, or a halide or nitrate salt derivative thereof; and
   (ii.) a non-ferrous transition metal oxide dissolved in a chelating agent for a time sufficient to control and/or inhibit corrosion of the metal.

13. The method of claim 12, wherein the $C_2$-$C_{12}$ acetylenic amine is selected from the group consisting of propargylamine, a propargylamine salt, N-methyl propargylamine, N,N-diethyl-2-propynyamine, 1,1-dimethylprop-3-inylamine and a dialkylaminoalkynol.

14. The method of claim 12, wherein the non-ferrous transition metal oxide is selected from the group consisting of antimony oxide, molybdenum oxide, titanium oxide, copper oxide, bismuth oxide, chromium oxide and zirconium oxide.

15. The method of claim 12, wherein the metallic alloy is carbon steel.

16. The method of claim 12, wherein the brine contains zinc halide salt.

17. The method of claim 12, wherein the at least one $C_2$-$C_{12}$ acetylenic alcohol is methyl-butynol.

18. The method of claim 12, wherein the chelating agent is selected from the group consisting of phosphonic acid, an alkyl phosphonic acid, an aminoalkyl phosphonic acid or a salt or ester derivative thereof.

19. The method of claim 18, wherein the chelating agent is (i.) bis-aminoalkyl ether phosphonates; or (ii.) a mixture of a monoalkanol amine phosphonate and a bis-hexalkylene triamine phosphonate.

20. The method of claim 12, wherein the well operation is a completion process.

21. A method of treating an oil or gas well in order to control, reduce or and/or inhibit metallic corrosion in the well which comprises introducing into the oil or gas well a corrosion inhibiting effective amount of a composition comprising (i) an acetylenic amine selected from the group consisting of propargylamine, a propargylamine salt, a substituted propargylamine and dialkylaminoalkynol; and (ii) a transition metal oxide dissolved in a chelating agent, wherein the transition metal oxide is other than an iron containing metal oxide.

22. The method of claim 21, wherein the composition is introduced to a brine having a density greater than or equal to 10 ppg either during, before or after the brine is introduced into the well and further wherein the brine is calcium chloride brine, calcium bromide brine, zinc bromide brine or a combination thereof.

23. A method of completing a well which comprises introducing into the well during completion of the well a corrosion inhibiting effective amount of a composition comprising:
   (i.) at least one corrosion inhibitor selected from the group consisting of a $C_2$-$C_{12}$ acetylenic alcohol and a $C_2$-$C_{12}$ acetylenic amine or a halide or nitrate salt derivative thereof; and
   (ii.) a transition metal oxide, other than an iron containing metal oxide, dissolved in a chelating agent.

24. The method of claim 23, wherein the acetylenic amine is selected from the group consisting of proparylamine, propargylamine hydrochloride, N-methyl propargylamine, N,N-diethyl-2-propynyamine, 1,1-dimethylprop-3-inylamine and a dialkylaminoalkynol.

25. A method of controlling and/or reducing the corrosive effects on metallic surfaces during completion of a production well with a brine having a density greater than or equal to 10 ppg, the method comprising introducing to the brine, either before, during or after introduction of the brine into the well, a composition comprising (i) a $C_2$-$C_{12}$ acetylenic alcohol or amine or a halide or nitrate salt derivative thereof; and (ii) a transition metal oxide solubilized in a chelating agent, wherein the transition metal oxide is other than an iron containing metal oxide.

26. The method of claim 25, wherein the chelating agent is selected from the group consisting of 1-hydroxyethylidene-1,1-diphosphonic acid-1, aminotri(methylene phosphonic acid, diethylenetriaminepentamethylenephosphonic acid, ethylenediamine tetra(methylene phosphonate), diethylenetriamine penta(methylene phosphonate), triamine- and tetramine-polymethylene phosphonates having between from about two to about ten methylene groups between each nitrogen atom, polyaminoalkylene phosphonates having between from about 2 to about 10 nitrogen atoms, ethylenediaminetetraacetic acid and salts thereof, cyclohexanediaminetetraacetic acid and salts thereof, diethylenediaminepentaacetic acid and salts thereof, lactic acid and salts thereof and nitrilotriacetic acid and salts thereof.

* * * * *